United States Patent
Kulakowski et al.

[11] Patent Number: 5,548,572
[45] Date of Patent: Aug. 20, 1996

[54] SPARE AND CALIBRATION SECTOR MANAGEMENT FOR OPTICAL WORM MEDIA

[75] Inventors: John E. Kulakowski; Judson A. McDowell, both of Tuscon, Ariz.; Kurt A. Rubin, Santa Clara, Calif.

[73] Assignee: International Business Machines Corporation, Armonk, N.Y.

[21] Appl. No.: 414,825

[22] Filed: Mar. 31, 1995

[51] Int. Cl.$^6$ .................................................. G11B 7/00
[52] U.S. Cl. ........................... 369/116; 369/124; 369/58; 369/275.1; 369/275.3
[58] Field of Search .................................. 369/116, 124, 369/126, 109, 106, 110, 47, 44.26, 275.1, 275.2, 275.3, 275.4, 58, 44.32

[56] References Cited

U.S. PATENT DOCUMENTS

| | | | |
|---|---|---|---|
| 5,185,733 | 2/1993 | Finkelstein et al. | 369/116 |
| 5,226,027 | 7/1993 | Bakx | 369/58 |
| 5,239,533 | 8/1993 | Yoshimaru et al. | 369/275.1 |
| 5,305,298 | 4/1994 | Yokota | 369/116 |
| 5,347,503 | 9/1994 | Koyama et al. | 369/44.32 |
| 5,388,090 | 2/1995 | Hoshino et al. | 369/275.3 |
| 5,418,767 | 5/1995 | Gaudet et al. | 369/58 |
| 5,418,773 | 5/1995 | Kakx et al. | 369/275.1 |

FOREIGN PATENT DOCUMENTS

| | | |
|---|---|---|
| 0404251 | 6/1990 | European Pat. Off. . |
| 0404249 | 6/1990 | European Pat. Off. . |
| 0442566 | 2/1991 | European Pat. Off. . |
| 0555065 | 2/1993 | European Pat. Off. . |
| 0577214 | 6/1993 | European Pat. Off. . |
| 9522142 | 8/1995 | WIPO . |

Primary Examiner—Loha Ben
Attorney, Agent, or Firm—D. A. Shifrin

[57] ABSTRACT

The present invention provides efficient management of calibration and spare sectors on a banded optical write-once, read-many (WORM) disk. A portion of each band on the disk includes a user data area and a reserved area. Sectors in the reserved area are usable either as spare sectors, replacing defective sectors in the user area, or as calibration sectors, for use when the laser write-power level is calibrated. Sectors preferably are used for sparing from one end of the reserved area while sectors are used for calibration from the opposite end. A common overflow reserved area can also be provided for use if all of the sectors in one or more primary reserved areas associated with any of the bands have been exhausted.

18 Claims, 2 Drawing Sheets

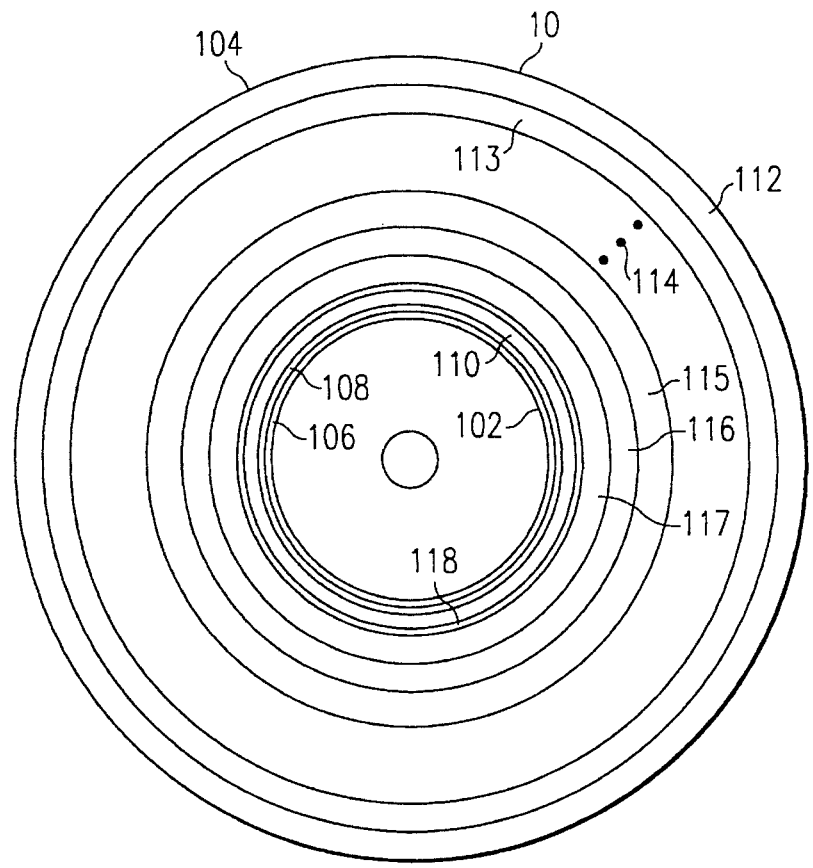
FIG. 2
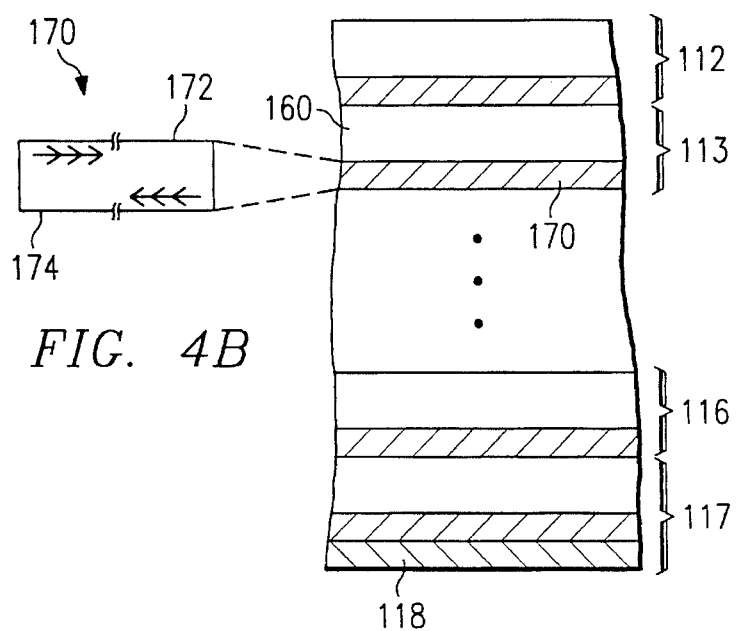
FIG. 4B
FIG. 4A

SPARE AND CALIBRATION SECTOR MANAGEMENT FOR OPTICAL WORM MEDIA

TECHNICAL FIELD OF THE INVENTION

The present invention relates to optical storage devices, and in particular, to management of spare and calibration sectors in a write-once optical storage system.

BACKGROUND OF THE INVENTION

When information is recorded onto optical media, the laser power should be established at such a level as to provide well formed recording marks, whether the marks are represented by changes in the reflective polarization of a spot on a rewritable magneto-optical (MO) disk, by pits burned into the surface of an ablative write-once disk or by changes in reflectivity between amphorous and crystiline areas of a phase change (PC) disk. However, even if the laser power is fixed when an optical disk drive is manufactured, many factors can cause such a fixing to be less than optimum. For example, two pieces of media from different manufacturers, or even from different batches from the same manufacturer, may have slightly different characteristics and, therefore, react slightly differently to the application of the same laser power lever. Other factors which can affect the optimum laser power level include the age of the drive and media, the operating temperature of the drive, the temperature of the media and any temperature differential between the media and the drive the extent of media contamination, changes in the laser spot size and any focus or tracking sensor offsets.

As a result, techniques have been developed for drive self-calibration during use. In one such technique, a calibration pattern (which cannot be confused with user data) is recorded onto one or more sectors at varying laser power levels. The sector is read back and, based upon such parameters as readback signal amplitude, mark edge jitter, mark peak pulse position, mark-space asymmetry and mark length, the optimum laser power level is selected for recording operations. Calibration can be performed each time the drive is powered on, at predetermined intervals or each time a verification operation fails, among others. When a calibration is performed on an MO disk (or other re-writable media), a sector previously used for calibration can be erased and reused. Consequently, only a few such sectors need to be available. In contrast, however, when a calibration is performed on a write-once, read many (WORM) disk, a sector previously used for calibration cannot be reused. Many calibration sectors should be available when the disk is new. The requirement for many calibration sectors may be particularly acute for the recently proposed 130 mm 1.3 GB per side WORM media which uses a pulse width modulation (PWM) recording technique as compared to the currently common 130 mm 325 MB per side WORM media using a peak pulse modulation (PPM) recording technique. The four times increase in recording capacity is primarily due to the increase in recording density, decrease in mark size, and adoption of the PWM recording technique. PWM requires greater precision in mark-space writing because the transitions are used to encode the information. In addition, the PWM uses marks of varying lengths placing an additional demand on quality mark formation. All of these factors increase the need for use of optimum write power to form quality marks with precisely placed edges. In fact, in some operating environments, a drive may have to be calibrated each time a disk is mounted to achieve required data reliability and performance. It can be appreciated that if all of the calibration sectors are used, no further information can be recorded onto the disk because there is no longer the ability to ensure a proper laser write power level.

When a recorded data sector is determined during verification to be defective, the data must be written to another sector. In one disk format configuration for WORM media, one or more regions of the disk are set aside as spare sectors to replace defective "primary" sectors. Again, however, if the spare sectors are exhausted, no further data can be reliably recorded.

SUMMARY OF THE INVENTION

In view of the foregoing, it is an object of the present invention to provide one or more areas on WORM media allocated to both calibration and spare sectors.

It is another object to provide an initialization process for WORM media to allocate areas on the media for both spare and calibration sectors.

It is still a further object to provide an optical storage device for recording data onto WORM media with improved calibration and spare sector usage.

Apparatus and method are provided for the efficient management of calibration and spare sectors on a banded optical write-once disk. Each band on the disk includes a user data area and a reserved area. Sectors in the reserved area are usable either as spare sectors, replacing defective sectors in the user area, or as calibration sectors, for use when the laser write-power level is calibrated. In one embodiment, spare and calibration sectors are not preassigned to separate and specific portions of the reserved area. Rather, sectors are used for sparing from one end of the reserved area while sectors are used for calibration from the opposite end. Moreover, to avoid potential tracking difficulties, spare sectors are preferably used beginning at the lowest address in reserved area and calibration sectors are used beginning at the highest address.

The number of sectors allocated to each reserved area is established when the media is initialized. For example, the media manufacturer can initialize the media before distribution giving the user no ability to adjust the allocation. When a disk is sold in an uninitialized state, the user can be given the option of choosing the relative size of the reserved area, or can be given a choice of several sizes, to adapt the media for a particular environment and pattern of usage.

In a further embodiment, a common overflow reserved area is provided for use if all of the sectors in one or more primary reserved areas associated with any of the bands have been exhausted.

Each sector on the WORM disk contains a DMP (defect management pointer) area which is recorded when the sector is used. When a sector in the user data area of a band is recorded, the address of the sector is written in a first word of the DMP and the starting address of the reserved area serving the band is written in a second word; the laser power level used to write the sector is written in a third word. When a sector in the reserved area of a band is used as a replacement for a defective sector, the address of the spare sector is written in the first word of the DMP and the address of the defective sector is written in the second word; the laser power level used to write the spare sector is written in the third word. When a sector in the reserved area is used as a calibration sector, a write-power calibration pattern is written in the first two words and the power level which the calibration process determines to be optimum is written in the third word.

A method is also provided for calibrating the drive during a multi-sector write operation. The first sector is recorded in the user data area of a particular band and then verified. If the verification is successful, the remaining sectors are recorded in the user data area. However, if the verification indicates that the laser write power is incorrectly set, a calibration is performed. Then, at the newly calibrated power level, the first sector is rerecorded as a spare sector in the reserved area and the remaining sectors are recorded in the user data area.

The foregoing and other features and advantages of the invention will be apparent from the following more particular description of preferred embodiments of the invention, as illustrated in the accompanying drawings.

BRIEF DESCRIPTION OF THE DRAWINGS

FIGS. 2 and 3 are simplified diagrammatic views of portions of a write-once optical disk of the present invention;

FIG. 4A is a simplified diagrammatic view of a radial portion of the write-once optical disk; and FIG. 4B is an enlarged view of a portion of one band of the write-once optical disk.

DETAILED DESCRIPTION OF THE INVENTION

Figure 1:
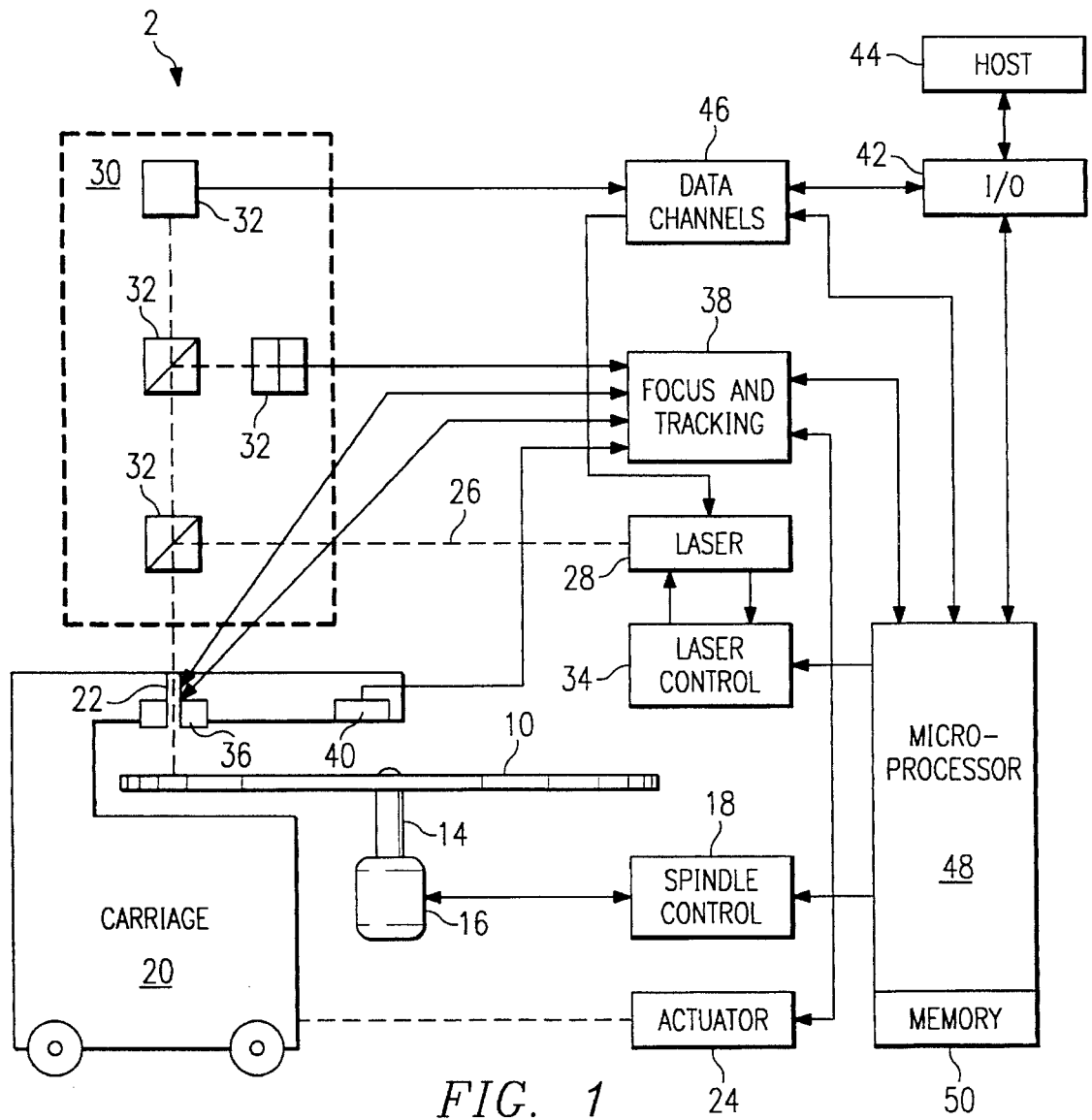
FIG. 1 is a block diagram of an optical storage device of the present invention.

FIG. 1 is a block diagram of an optical storage device of drive 2 in which the present invention can be employed. The drive 2 can be a write-once device or can be a multi-function device having the capability of recording either WORM or re-writable media. For purposes of clarity, various components of the drive 2, including those which pertain only to re-writable operations, have been omitted from FIG. 1 and will not be discussed.

A write-once optical disk 10 is mountable on a spindle 14 for rotation by a spindle motor 16 under the control of a spindle controller 18. Not shown is a loader mechanism by which the disk 10 is loaded into the drive 2 and lowered onto the spindle 14; when disk operations are completed, the loader mechanism reverses the process and ejects the disk from the drive 2. A headarm carriage 20 is movable radially relative to the disk 10 carrying an objective lens 22 for accessing data on any one of a large plurality of addressable tracks on the disk 10. The radial motion of the carriage 20 is controlled by a coarse actuator 24.

A light beam (represented by the dashed line 26) from a laser 28 is directed to an optical signal processing portion 30, comprising various optical and opto-electrical elements 32, which directs the light 26 through the lens 22 onto the surface of the disk 10. The laser 28 is controlled by a laser controller 34; focusing and tracking are performed by a fine actuator 36 controlled by focus and tracking circuits 38 with input from a relative position focus sensor 40.

The drive 2 is interconnected through an input/output interface 42 to a host device 44. Data to be recorded onto the disk 10 is transmitted by the host device 44 through the input/output interface 42 to data channels 46. Data read from the disk 10, after being converted from optical signals into electrical signals, is passed through the data channels 46 and transmitted through the input/output interface 42 to the host device 44. A microprocessor 48, which includes (or is interconnected with) a memory store 50, is interconnected to components of the drive 2 and directs the operation thereof.

FIG. 2 is a simplified diagrammatic view of the WORM disk 10 formatted in accordance with the present invention. Beginning at the inner diameter (ID) 102 and extending radially toward the outer diameter (OD) 104 is a control area comprising a phase-encoded part (PEP) 106, a standard format part (SFP) 108 and a manufacturer area (MFG) 110. Duplicates (not shown) of the SFP and MFG are located at the OD 104. The disk 10 has a single spiral track extending between the ID 102 and the OD 104 (although the spiral can instead extend in the reverse direction) which is divided into several radial bands 112–117 (or, alternatively, comprises a single band), each band having a plurality of addressable tracks and each track having a plurality of sectors. Ellipsis 114 represent a plurality of bands between bands 113 and 115. In one proposed 4X WORM format, the disk 10 has thirty-four bands numbered from the outside (band 0) toward the inside (band 33); tracks and sectors are similarly given addresses from outside to inside. However, this configuration is given by way of example only and not as any limitation of the present invention.

Figure 3:
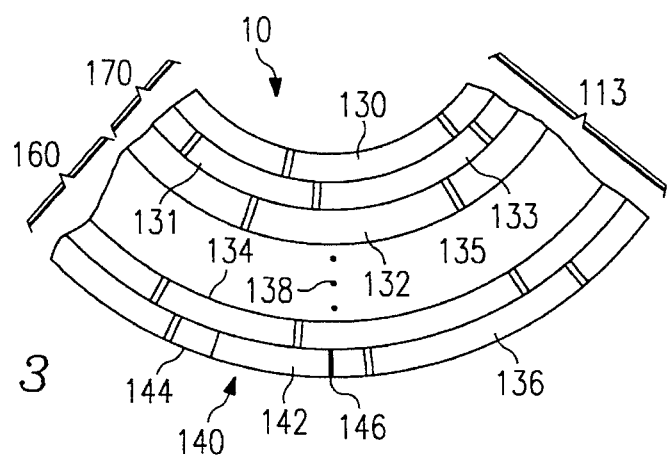

FIG. 3 is a simplified diagrammatic view of a portion of one exemplary band 113 having a plurality of sectors, only a small number of which (represented by sectors 130–136, 140 and ellipsis 138) are illustrated. A typical sector, such as sector 140, includes a header area 144 and a user data 142 having a defect management pointer (DMP) 146. The sectors in the band 113 are grouped into a user data area 160 and a reserved area 170. The number of sectors in each band is established when the disk 10 is manufactured and increases from the inner band to the outer band. However, as will be discussed below, in one embodiment the ratio of reserved sectors to user sectors in a band can be determined for each disk by the user when the disk is initialized, thereby establishing starting addresses for each reserved area 170. Alternatively, the ratio can be fixed at the time of disk manufacture and not be user configurable.

The DMP 146 of a sector, such as sector 140, in the user area 160 contains three four-byte words which are recorded during a write-operation. The first word contains the address of the sector 140. The second word contains the starting address of the reserved area 170 and serves as a general pointer to the reserved area 170, although not to a particular sector in the reserved area 170. The third word contains the value of the laser power which was used to write the sector 140.

Sectors in the reserved area 170, such as sector 130, also have a DMP area, although the contents of the DMP will vary depending upon the use of the sector as a spare sector or a calibration sector, as will be explained.

When data is recorded to the sector 140 during a write operation, the three words are recorded to the DMP 146. If the readability of the sector 140 cannot be verified, the data is recorded in an unused sector, such as the sector 132, (hereinafter, the spare sector) in the reserved area 170. The spare sector is located by the laser beam 26 scanning the reserved area 170 for the next available blank sector. Contemporaneously with recording the data, the address of the spare sector 132 is recorded in the first word of the DMP of the spare sector 132 and the address of the defective sector 140 which is being replaced is recorded in the second word. The laser power level is recorded in the third word.

When the laser write-power is to be calibrated as determined by the microprocessor 48 based upon predetermined criteria, such as the number of sectors which cannot be verified, the microprocessor 48 in the drive 2 directs the laser beam 26 to an unused sector, such as the sector 130, (hereinafter, the calibration sector) of the reserved area 170. The calibration sector is located by the laser beam 26 scanning the reserved area 170 for the next available blank sector.

A pattern of marks is recorded in the first and second words of the DMP, each mark being recorded with a different laser power setting. In one embodiment, the entire range of write-power levels is used to record the calibration marks. The drive 2 is then placed in a mark quality verification mode, the calibration marks are "read" back and the microprocessor 48 determines which power level produces the best mark quality. The laser power setting used to write the calibration mark is recorded in the third word of the DMP at the same time the calibration marks are recorded. Alternatively, the calibration marks recorded at a selected power level can be verified as to mark quality immediately after they are written and, if the marks satisfy the mark quality criteria, the power level used to record the mark is recorded in the third word of the DMP area of the calibration sector and no additional calibration marks are written. If, however, the mark does not satisfy the mark quality criteria, additional calibration marks are recorded at a different power level and the mark quality verified. As an alternative to using the entire calibration sector for a single power calibration test, the sector can be divided into "micro-sectors". A single micro-sector can be used for each calibration test and the power level recorded in the DMP area of the micro-sector. It will be appreciated that this alternative method of determining an appropriate or optimum laser power level will generally use less space in the reserved area 170 than the former method and it may be possible to use a single calibration sector for more than one calibration operation.

As previously noted, it is preferable that the laser power be calibrated as infrequently as possible in order to prevent premature exhaustion of calibration sectors. Consequently, a default power level can be programmed into the microprocessor 48. If during a recording operation, a predetermined number of sectors cannot be verified, indicating that the laser power level may be incorrect, the microprocessor can initiate the calibration procedure. In another embodiment for use during a multi-sector write operation, the first sector is recorded and an attempt is made to verify its readability. If the verification is successful, indicating a correct power level, the remaining sectors are recorded at the same level. However, if the verification is unsuccessful, the microprocessor 48 determines that a calibration is to be performed. Then, the first sector is re-written to a spare sector in the reserved area 170 and the remaining sectors are recorded in the user area 160 at the newly calibrated power level. Moreover, when the remaining sectors are verified, the write power level can be readjusted if necessary in preparation for the next write command, thereby further reducing the need to use another calibration sector.

The calibration pattern may consist of a 2T mark, a 6T space, a 4T mark and a 6T space repeated many times. Many patterns may be used as long as the written pattern allows for the separation of thermal effects of the written marks. The calibration pattern, if written at excessive write laser power, could produce excessively large marks that could affect the focus and tracking process, thus track following of laser beam 26 would be faulty. In addition, a calibration sector may not contain error correction codes or resync characters and thus can not be differentiated reliability from a sector with a large defect if written with incorrect laser power levels, again arguing for separation. Finally, the use of micro-sectors will result in areas of a calibration sector being unrecorded and appearing as a large media defect, again arguing for separation. Consequently, calibration sectors should not be intermixed with spare sectors in the reserved area 170. An alternative implementation that would permit intermixing of spares and calibration sectors would make use of tables to identify the sectors in the reserved area used for spares and those used for calibration. Thus the need to read or track reliably over the data area of a calibration sector could be avoided. The disadvantage of this implementation is the consumption of valuable disk space by maintaining such tables on write-once media. Each time a sector is spared or a calibration section is written, the tables must be updated consuming additional space. Although it would be possible for one set of addresses in the reserved area 170 to be specifically allocated to spare sectors and a separate set of addresses specifically allocated to calibration sectors, such a predetermined and invariable allocation of space would not necessarily be suitable in all operating environments. For example, in an environment in which data is written to a disk relatively frequently, or in which disks are mounted/unmounted often, or in which only small amounts of data are recorded in a single operation, operating parameters can change often. In such a situation, re-calibration may be required frequently, exhausting the calibration sectors before consuming all of the data or spare sectors. On the other hand, when the operating environment generally consists of frequent recording of large blocks of data, the parameters may be more stable and fewer calibrations will be needed but possibly more spare sectors. Therefore, the allocation of sectors between spare and calibration sectors should preferably be performed dynamically. In the present invention, rather than allocating a particular portion of the reserved area 170 for sparing and the balance to calibration, it is preferred that spare sectors and calibration sectors be expended from opposite ends of the reserved area 170, as illustrated by the arrows in FIG. 4B. Moreover, because of the tracking problems associated with calibration sectors, it is preferred that the calibration sectors be used from the inner end (higher addresses) 172 of the reserved area 170 towards the outer end (lower addresses) while the spare sectors be used from the outer end 174 toward the inner. Thus, the available space in the reserved area 170 is exhausted only when there are no free sectors remaining in the reserved area 170, regardless of the relative number of sectors used for sparing and calibration.

The present invention provides a further area on the disk 2 for spare and calibration sectors to be used when the reserved area 170 of any band has been filled. A common overflow reserved area 118 is contained in the last band 117 along with the reserved area for the band 117 (FIG. 4A). The last band 117 is a preferred location for the common overflow area 118 because drive performance is typically the lowest in this band and it is desired not to employ a high performance area on the disk 10 for such a use. The common overflow area 118 is used in the same manner as the reserved area 170 but can contain spare and calibration sectors associated with more than one band. While there may not be a pointer in the primary reserved area 170 to the address of the common overflow area 118, the drive 2 can be programmed to seek to the common overflow area 118 in the event that it finds the primary reserved area 170 full or in the event that it fails to find in the reserved area 170 the spare sector as a replacement for a previously recorded for defective user sector. Alternatively, the drive 2 can be programmed to seek to the next available reserved area (that is, to the reserved area of the next band toward the ID 102) for calibration purposes if the reserved area of a particular band is full and seek to the common overflow area 118 for sparing (because the optimum laser power level may vary from band to band, it is preferable to perform a calibration as close as possible to the desired band).

As previously discussed, the size of each reserved area 170 can be established by the media manufacturer if the manufacturer initializes the media or can be established by the user. If the latter, the user determines approximately how many spare sectors and how many calibration sectors will be needed for the entire disk based upon the particular operating environment and conditions. The sum of the two is then allocated proportionally among the bands based upon the total number of sectors in each band (which can, in some disk formats, vary from band to band). Alternatively, a default number can be provided and the user given the option of doubling or tripling the value when the disk 10 is initialized. The microprocessor 48 then calculates the beginning and ending addresses for each user data area 160 and each reserved area 170 for each band, as well as the beginning and ending addresses for the common overflow area 118, and records this information in the disk structure table (DST) sector on the disk 10. The information in the DST enables the microprocessor to translate logical block addresses received from the host 44 into physical track and sector addresses on the disk 10.

While the invention has been particularly shown and described with reference to preferred embodiments thereof, it will be understood by those skilled in the art that various changes in form and details may be made therein without departing from the spirit and scope of the invention.

What is claimed is:

1. A method of calibrating laser write power in an optical drive, comprising the steps of:

mounting a write-once optical disk in a drive unit, the disk having a plurality of recording bands, each band having a reserved area comprising calibration sectors and spare sectors, each band further having a user area comprising user data sectors;

moving an optical head to a selected band;

determining if the laser write power should be calibrated;

if the laser write power should be calibrated, seeking to an unused first calibration sector in the reserved area of the selected band;

establishing an information field in the first calibration sector;

writing a write power calibration pattern in the first calibration sector;

reading the write power calibration pattern from the first calibration sector; and determining a write power value to be used for recording data onto user data sectors in the selected band of the optical disk.

2. The method of claim 1, further comprising the steps of, if there are no unused first calibration sectors in the reserved area of the selected band:

seeking to an unused second calibration sector in a common overflow area of the disk;

establishing an information field in the second calibration sector;

writing a write power calibration pattern in the second calibration sector;

reading the write power calibration pattern from the second calibration sector; and determining a write power value to be used for recording data onto user data sectors in the selected band of the optical disk.

3. The method of claim 1, further comprising the steps of:

recording data onto a selected user data sector in the selected band at the determined write power value;

verifying the data recorded onto the selected user sector;

if said verification step fails, seeking to an unused first spare data sector in the reserved area of the selected band;

establishing an information field in the first spare data sector;

recording the data onto the first spare data sector; and verifying the data recorded onto the first spare data sector.

4. The method of claim 3, wherein:

said step of seeking to an unused first calibration sector in the reserved area of the selected band comprises the step of seeking to an unused sector closest to a first end of the reserved area; and said step of seeking to an unused first spare data sector in the reserved area of the selected band comprises the step of seeking to an unused sector closest to a second end of the reserved area.

5. The method of claim 3, further comprising the steps of, if there are no unused first spare data sectors in the reserved area of the selected band:

seeking to an unused second data spare sector in a common overflow area of the disk;

establishing an information field in the second spare data sector;

recording the data onto the second spare data sector; and verifying the data recorded onto the second spare data sector.

6. The method of claim 5, wherein:

said step of seeking to an unused first calibration sector in the reserved area of the selected band comprises the step of seeking to an unused sector closest to a first end of the reserved area;

said step of seeking to an unused first spare data sector in the reserved area of the selected band comprises the step of seeking to an unused sector closest to a second end of the reserved area; and said step of seeking to an unused second spare data sector in the common overflow area comprises the step of seeking to an unused sector closest to a first end of the common overflow area.

7. The method of claim 1, further comprising the steps of:

recording first data onto a first selected user data sector in the selected band at a first write power value;

verifying the first data recorded onto the first selected user sector;

if said verification step fails, seeking to an unused first calibration sector in the reserved area of the selected band;

performing said establishing, writing, reading and determining steps;

seeking to an unused first spare data sector in the reserved area of the selected band;

establishing an information field in the first spare data sector;

recording the first data onto the first spare data sector;

verifying the first data recorded onto the first spare data sector;

moving the optical head in a radial direction to the selected band; and recording the balance of the data to second sectors in the selected band at the determined write power value.

8. A write-once optical disk, comprising:

a spiral track extending between inner and outer radial positions, said spiral track having a plurality of logical tracks grouped into a plurality of data bands;

a predetermined plurality of primary data sectors in each of said data bands;

a reserved area in each of said data bands, said reserved area having a predetermined plurality of sectors, each of which is usable as either a spare sector or a calibration sector; and a common overflow area having a predetermined plurality of sectors, each of which is usable for either sparing or calibration.

9. The write-once optical disk of claim 8, wherein:

said common overflow area has a first end and a second end; and during a recording operation, usage of sectors in said common overflow area for sparing is in a direction from an unused sector closest to said first end toward said second end and usage of sectors in said common overflow area for calibration is in an opposite direction from an unused sector closest to said second end toward said first end.

10. The write-once optical disk of claim 8, wherein:

each said reserved area has a first end and a second end; and during a recording operation, usage of sectors in said reserved area for sparing is in a direction from an unused sector closest to said first end toward said second end and usage of sectors in said reserved area for calibration is in an opposite direction from an unused sector closest to said second end toward said first end.

11. The write-once optical disk of claim 8, wherein sectors in a band include a header area and a user data area.

12. The write-once optical disk of claim 11 wherein said data area of a primary data sector comprises:

a first portion in which an address of said primary data sector is recordable;

a second portion in which an address of said reserved area of said band is recordable; and a third portion in which a laser calibration value is recorded.

13. The write-once optical disk of claim 11, wherein said data area of a spare sector comprises:

a first portion in which an address of said spare sector is recordable;

a second portion in which an address of a defective primary data sector in said band is recordable; and a third portion in which a laser calibration value is recorded.

14. The write-once optical disk of claim 11, wherein said data area of a calibration sector comprises:

a first portion in which at least a portion of a calibration pattern is recordable; and a second portion in which a laser calibration value is recorded.

15. In a system for recording data onto an optical WORM disk, the disk having a plurality of data bands, each band having a first plurality of sectors in a user area and a second plurality of sectors in a reserved area, the system having a loader mechanism, a spindle motor on which the optical disk is mountable, an interface for transmitting/receiving data and instructions to/from a host device, a laser light source, an optical head for recording/reading data to/from the optical disk, an actuator for moving said optical head, and a controller for directing operations of said loader mechanism, said spindle motor, said interface, said optical head and said actuator, the improvement comprising:

a processor for determining when a laser write-power calibration is to be initiated;

means for directing a light beam from said laser light source onto a first predetermined sector in said reserved area if calibration is to be initiated;

means for writing a calibration pattern in said first predetermined sector;

means for reading the calibration pattern and determining an adjusted write-power level;

means for setting the write-power level to the adjusted write-power level;

means for recording first data on a predetermined data sector in said user area;

means for verifying the first data;

means for directing the light beam from said laser light source onto a second predetermined sector in said reserved area if the verification fails; and means for re-recording the first data onto said second predetermined sector.

16. In the data recording system of claim 15, wherein:

said means for directing the light beam onto the first predetermined sector in said reserved area comprises means for directing the light beam onto the first predetermined sector in a first end of said reserved area; and said means for directing the light beam onto the second predetermined sector in said reserved area comprises means for directing the light beam onto the second predetermined sector in a second end of said reserved area, opposite the first end.

17. In the data recording system of claim 15, wherein said means for recording the first data in the predetermined data sector comprises means for recording an address of the predetermined data sector in a first word of the predetermined sector, recording a beginning address of said reserved area in a second word of the predetermined data sector and recording a laser write-power level in a third word of the predetermined data sector.

18. In the data recording system of claim 15, further comprising:

means for receiving an input from a user indicating the second plurality of sectors to be allocated to said reserved area of each band; and means for determining a beginning address and an ending address of each reserved area of each band.

* * * * *